(12) United States Patent
Safrai et al.

(10) Patent No.: US 8,804,733 B1
(45) Date of Patent: Aug. 12, 2014

(54) CENTRALIZED PACKET PROCESSOR FOR A NETWORK

(75) Inventors: Uri Safrai, Haifa (IL); Tsahi Daniel, Palo Alto, CA (US)

(73) Assignees: Marvell International Ltd., Hamilton (BM); Marvell Israel (M.I.S.L.) Ltd., Yokneam (IL)

( * ) Notice: Subject to any disclaimer, the term of this patent is extended or adjusted under 35 U.S.C. 154(b) by 429 days.

(21) Appl. No.: 13/151,927

(22) Filed: Jun. 2, 2011

Related U.S. Application Data

(60) Provisional application No. 61/350,769, filed on Jun. 2, 2010.

(51) Int. Cl.
*H04L 12/28* (2006.01)

(52) U.S. Cl.
USPC ............ 370/392; 370/395.53; 370/398

(58) Field of Classification Search
None
See application file for complete search history.

(56) References Cited

U.S. PATENT DOCUMENTS

| | | | |
|---|---|---|---|
| 7,224,668 B1 * | 5/2007 | Smethurst et al. | 370/229 |
| 7,606,239 B2 * | 10/2009 | Maveli et al. | 370/398 |
| 7,792,097 B1 * | 9/2010 | Wood et al. | 370/352 |
| 7,796,594 B2 | 9/2010 | Melman et al. | |
| 7,969,880 B2 * | 6/2011 | Yano et al. | 370/230.1 |
| 8,077,730 B2 * | 12/2011 | Maveli et al. | 370/398 |
| 8,144,706 B1 * | 3/2012 | Daniel et al. | 370/389 |
| 8,238,340 B2 * | 8/2012 | Mack-Crane et al. | 370/392 |
| 8,457,117 B1 * | 6/2013 | Wood et al. | 370/353 |
| 2003/0039256 A1 * | 2/2003 | Carlberg et al. | 370/395.64 |
| 2004/0136371 A1 * | 7/2004 | Muralidhar et al. | 370/389 |
| 2007/0104192 A1 * | 5/2007 | Yoon et al. | 370/389 |
| 2008/0056122 A1 * | 3/2008 | Madhi et al. | 370/216 |
| 2008/0148341 A1 * | 6/2008 | Ferguson et al. | 726/1 |
| 2011/0134925 A1 | 6/2011 | Safrai et al. | |
| 2012/0060010 A1 * | 3/2012 | Shimozono et al. | 711/165 |

OTHER PUBLICATIONS

U.S. App. No. 13/151,948, Uri Safrai, "Interface Mapping in a Centralized Packet Processor for a Network," filed Jun. 2, 2011.

* cited by examiner

*Primary Examiner* — Michael J Moore, Jr.

(57) ABSTRACT

A centralized packet processor device for use in a communication system includes a plurality of physical ports to couple the centralized packet processor device to a plurality of network devices, a port manager coupled to the plurality of physical ports and configured to assign to a packet received at the centralized packet processor device a virtual port that uniquely identifies at least one of a physical port and a trunk of the network device from which the packet is received and that is used with the centralized packet processor to process the packet, and a packet processor unit coupled to the plurality of physical ports, where the packet processor is configured to process the packet using the assigned virtual port.

20 Claims, 9 Drawing Sheets

CENTRALIZED PACKET PROCESSOR FOR A NETWORK

CROSS-REFERENCE TO RELATED APPLICATIONS

This application claims the benefit of U.S. Provisional Patent Application No. 61/350,769, entitled "Switch with Support for Centralized Chassis" and filed on Jun. 2, 2010, the entire disclosure of which is hereby incorporated by reference herein.

This application is related to a commonly owned, co-pending U.S. patent application Ser. No. 13/151,948, entitled "Interface Mapping in a Centralized Packet Processor for a Network," filed on the same day as the present application, and hereby expressly incorporated by reference herein.

FIELD OF THE DISCLOSURE

The present disclosure relates generally to communication networks and, more particularly, to network switching and/or devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some networking applications require processing and forwarding a high number of data units, such as packets, communication frames, etc. The amount of packet traffic a network device can handle is limited, in part, by the number of front panel ports, i.e., physical ports via which the network device is connected to other devices or networks. In some implementations, the processing capacity of a network device is also limited by such resources as memory, central processing unit (CPU) speed, and operating system resources.

SUMMARY

In an embodiment, a centralized packet processor device for use in a communication system includes a plurality of physical ports to couple the centralized packet processor device to a plurality of network devices, a port manager coupled to the plurality of physical ports and configured to assign to a packet received at the centralized packet processor device a virtual port that uniquely identifies at least one of a physical port and a trunk of the network device from which the packet is received and that is used with the centralized packet processor to process the packet, and a packet processor unit coupled to the plurality of physical ports, where the packet processor is configured to process the packet using the assigned virtual port.

In another embodiment, a centralized packet processor for use in a communication system includes a plurality of physical ports coupled to a plurality of network devices to receive a packet, where each of the plurality of network devices includes a respective set of physical ports, a port manager coupled to the plurality of physical ports and configured to assign a virtual port to the packet using an identifier of the physical port of the network device at which the packet is received for use at the centralized packet processor, and a packet processor unit coupled to the plurality of physical ports, where the packet processor is configured to (i) process the received packet using the assigned virtual port and (ii) apply a packet processing function that is not available at the network device from which the packet is forwarded.

In another embodiment, a method for processing packets in a centralized packet processor, where the centralized packet processor includes a plurality of physical ports and operates in a communication network including the centralized packet processor and a plurality of network devices communicatively coupled to the centralized packet processor via respective ones of the plurality of physical ports, includes receiving, via one of the plurality of physical ports of the centralized packet processor, a packet forwarded from one of the plurality of network devices, assigning a virtual port to the received packet to uniquely identify at least one of a physical port and a trunk of the network device from which the packet is received, and processing the packet using the assigned virtual resource identifier.

DETAILED DESCRIPTION

Figure 1:
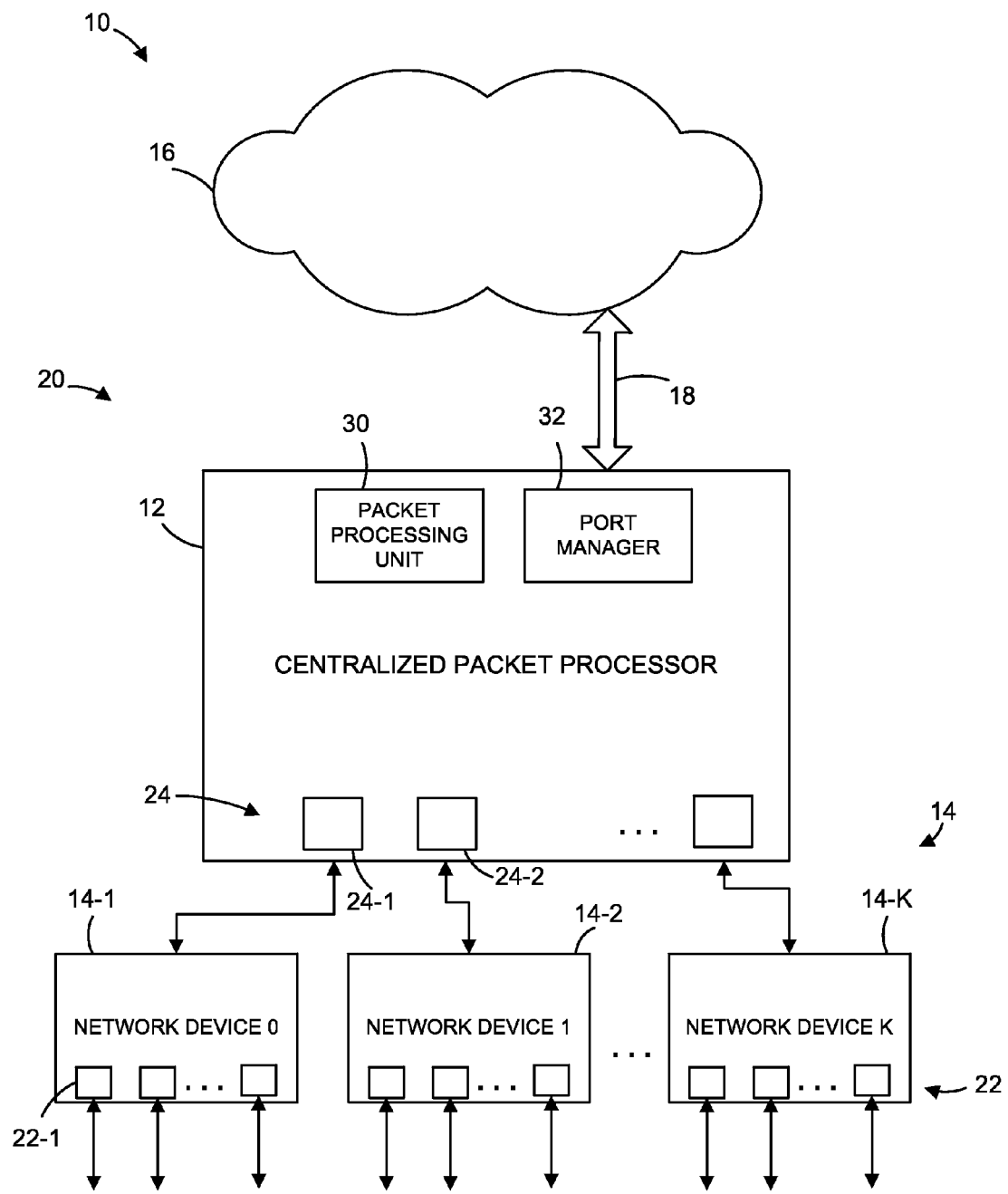
FIG. 1 is a block diagram of a communication system in which a centralized packet processor is communicatively coupled to several network devices to provide packet processing functionality for at least some packets received or originated at the network devices, according to an embodiment of the present disclosure.

FIG. 1 is a block diagram of a network 10 in which a centralized packet processor 12 processes and forwards data units (e.g., packets, frames) received from network devices 14 or a network 16, according to an embodiment. In some implementations, the network devices 14 are line cards and the centralized packet processor 12 operates as a chassis in which the network devices 14 are mounted. For example, in an embodiment, the centralized packet processor 12 includes a housing configured to accept slide-in line cards (or "blades") and a backplane with crossbar functionality to provide electrical connections between the blades. In some of these implementations, the centralized packet processor 12 provides both crossbar functionality to physically interconnect the network devices 14 and packet processing functionality for packets received from the network devices 14, and thus the centralized packet processor 12 is sometimes referred to herein as "centralized chassis." A communication link 18, such as an Ethernet link, connects a certain port of the centralized packet processor 12 to the network 16. The centralized packet processor 12 and the network devices 14 define a single logical system 20, and accordingly the network devices 14 define respective component systems that make up the single logical system 20, in an embodiment.

Depending on the embodiment, the network devices 14 are switches, routers, bridges, etc. In an embodiment, the logical system 20 is a switching system operating in a data center, for example. Each of the network devices 14 includes several physical (or "front panel") ports 22 that together define a single set of front panel ports of the logical system 20, and the centralized packet processor 12 includes a set of physical ports 24. In one embodiment, the front panel ports provide multiple two-way, point-to-point communication links to other devices, such as bridges, other switches in the switching system, endpoints, etc. In an embodiment, one of the physical ports 22 on each network device 14 is used to connect the network device 14 to a respective one of the physical ports 24. In accordance with an example configuration, each of K network devices 14 includes N physical ports, one of which connects the corresponding network device 14 to the centralized packet processor 12, so that the logical system 20 includes a set of (N−1)*K front panel ports. In another embodiment, some of the physical ports 24 of the centralized packet processor 12 are also used as front panel ports, rather than ports via which the centralized packet processor 12 communicates with the corresponding network devices 14.

In some embodiments, the centralized packet processor 12 implements a feature set that complements or extends the functionality of the network devices 14. In one such embodiment, the network devices 14 are not configured to support TRILL protocol or VPLS, and the centralized packet processor 12 includes a packet processing unit 30 that provides TRILL and VPLS support to the logical system 20. For example, the network device 14-1 forwards a packet of a type unsupported at the network device 14-1 to the centralized packet processor 12 via one of the physical ports 24, the packet processing unit 30 processes the packet, and the centralized packet processor 12 forwards the packet to the network device 14-1, another one of the network devices 14, or the network 16. In some embodiments, the centralized packet processor 12 provides protocol translation (e.g., substitution of a header of one protocol for the header of another protocol) to packets traveling between two or more network devices 14. For example, the centralized packet processor 12 in an embodiment translates between MPLS and TRILL protocols.

The network devices 14 implement queues for the physical ports 24, and the centralized packet processor 12 does not implement queues for the physical ports of the network devices 12, according to an embodiment. Further, in an embodiment, the network devices 14 additionally implement one or more of scheduling, shaping (i.e., packet prioritization), layer 2 (L2) virtual LAN (VLAN) port membership determination, etc. for the physical ports 24, so that the centralized packet processor 12 does not provide these functions for the network devices 14. Still further, in an embodiment, the network devices 14 implement packet duplication local to the corresponding network device. For example, if a packet received at one of the physical ports 24 of the network device 14-1 is to be transmitted to one or more of the other physical ports 24 of the network device 14-1, the duplication of the packet is implemented in the network device 14-1. As another example, a packet transmitted to the network device 14-1 from the centralized packet processor 12 for transmission via more than one port of the network device 14-1 is duplicated at the network device 14-1, so that the centralized packet processor 12 does not transmit multiple copies of the packet to the network device 14-1. However, depending on the embodiment, decisions to duplicate a packet at a network device, as well as instructions therefor, are implemented at the centralized packet processor 12.

However, in another embodiment, the centralized packet processor 12 implements packet duplication for one or more network devices 14. In yet another embodiment, at least partial packet duplication is implemented in the centralized packet processor 12, and additional packet duplication is implemented in one or more network devices 14. Further, in at least some of the embodiments in which packet duplication is implemented in the centralized packet processor 12, the network devices 14, or both, high-level packet duplication decisions (e.g., determining how many duplications are required, determining which of the network devices 14 should perform duplication) are implemented in the centralized packet processor 12.

Thus, in some embodiments, the centralized packet processor 12 provides partial packet processing functionality (e.g., high-level packet duplication decisions) to the logical system 20, and the network devices 14 provide other partial packet processing functionality (e.g., packet duplication). In at least some of the embodiments, the partial packet processing implemented in the centralized packet processor 12 is more complex and/or at a higher level (e.g., routing, protocol translation) than the partial packet processing functionality of the network devices 14 (e.g., packet duplication, scheduling, shaping). In at least some of the embodiments, the centralized packet processor 12 performs most or all ingress and egress packet processing functionality for the front panel ports 22. Also, in an embodiment, the centralized packet processor 12 extends the functionality of the less advanced (e.g., legacy) network devices 14 by providing additional features related to routing, switching, protocol translation, etc. In an embodiment, some or all of the network devices are port-VLAN legacy devices.

By contrast, in another implementation, a logical system similar to the logical system 20 includes a central device, generally similar to the centralized packet processor 12, that implements one or more of queues, schedulers, shapers, L2 VLAN port membership determination, etc. for the physical ports of the several network devices to which the central device is coupled. In this implementation, the central device requires memory and processing resources to support large data structures. Moreover, the number of front panel ports in these embodiments is limited by the number of queues, schedulers, etc. supported by the central device. On the other hand, an implementation of the centralized packet processor 12 that does not implement queues, schedulers, shapers, etc. need not support large data structures. Further, the number of front panel ports which the centralized packet processor 12 supports in this implementation is largely unlimited by the resources available at the centralized packet processor 12, and the logical system 20 accordingly can support a large number of front panel ports. In particular, the number of front panel ports support by the centralized packet processor 12 in at least some scenarios exceeds the number of physical ports (and data queues) available at the centralized packet processor 12.

According to an embodiment, the centralized packet processor 12 includes a port manager 32 that translates the physical ports of the network devices 14 to extended ports (eports) for use in processing and forwarding packets received from the network devices 14 or the network 16. As discussed below, in some embodiments, the centralized packet processor 12 utilizes a front-panel-to-centralized port translation scheme that does not require data structures, mapping tables, etc. In an embodiment, eports are not physical entities, but merely logical assignments. Thus, eports are sometimes referred to herein as "virtual ports." However, in at least some of the embodiments, eports used by the centralized packet processor 12 have a one-to-one correspondence with actual physical ports on the network devices 14. For example, the port manager 32 in some of these embodiments assigns a unique eport number to every port in the set of front panel ports. Thus, if the network device 14-1 has a physical port identified locally (i.e., at the network device 14-1) as port $P_1$, and a the network device 14-2 has a physical port with the same local identifier $P_1$, the port manager 32 assigns different eport identifiers $E_1$ and $E_2$ to the first port and the second port, respectively. In general, however, multiple eports can be mapped to the same physical port or, conversely, multiple physical ports can be mapped to the same eport.

In addition (or as an alternative) to virtual ports, the centralized packet processor 12 in some implementations associates physical and logical interface resources (or simply "interfaces") at the network devices 14 with other types of virtual resources of the centralized packet processor 12. For example, if certain ports at a network device 14 are grouped into a trunk, the network device in some cases forwards a packet to the centralized packet processor 12 that includes an identifier of the trunk via which the packet is received, rather than the physical port at which the packet is received. Of course, in some embodiments, the network device 14 provides an indication of both the physical port and the trunk in the packet. In some of these embodiments, the centralized packet processor 12 generates a virtual resource identifier that uniquely identifies the trunk in the centralized packet processor 12 (i.e., a virtual trunk identifier), a virtual resource identifier that uniquely identifies a front panel port in the centralized packet processor 12 (i.e., a virtual port identifier), or both. In an embodiment, the virtual trunk identifier corresponds is a virtual port selected from a configurable range that allows the centralized packet processor 12 to recognize the virtual port as identifying a trunk.

In an embodiment, the centralized packet processor 12 is configured to associate packets with virtual domains (also referred to herein as "extended virtual local area networks" or "eVLANs"). An eVLAN is similar to a typical VLAN, but corresponds to eports rather than physical ports. Further, in an embodiment, some or all of the network devices 14 are configured to associate packets with eVLANs. In some embodiments, groups of eports correspond to particular eVLANs. In an example configuration, a first group of eports $E_1, E_2, \ldots E_N$ corresponds to a first eVLAN, and another group of eports $E_{N+1}, E_{N+2}, \ldots E_M$ corresponds to a second eVLAN. In some embodiments, some eports correspond to more than one eVLAN. In general, the centralized packet processor 12 can operate with packets associated with any suitable number of eVLANs. Further, in an embodiment, an eVLAN includes one or more eports corresponding to another eVLAN.

In an embodiment, some or all of the network devices 14 are legacy port-VLAN based devices. Generally speaking, in a port-VLAN based system, a switching device, such as one of the network devices 14, determines to which VLAN a packet belongs based on, at least in part, the configuration of a port on which the packet is received. For example, two physically remote hosts can operate in a same VLAN and communicate via a high-speed link and one or more intermediate switching devices. The switching devices associate one or more ports with the VLAN, while other ports at the switching devices are not associated with the VLAN. Further, in some implementations, hosts operating in a VLAN exchange communication frames that include tags of a certain length (e.g., four bytes) that identify the VLAN to which the communication frame belongs.

The level of packet processing to be performed at the network devices 14 is configurable, according to at least some of the embodiments. In an example configuration, ingress and egress processing at each network device 14 is bypassed, and the network devices 14 perform only limited processing functions such as egress queuing, scheduling, shaping, VIDX duplication of traffic subject to L2 bridge processing, VLAN flooding, Multicast/Broadcast ("MC/BC") source filtering, other multi-destination processing, etc. In some configurations, additional processing (e.g., ingress port rate limiting) is enabled for some or all network devices 14. Further, in some configurations, network devices 14 forward only selected packets to the centralized packet processor 12 and process the remaining packets locally, i.e., at the corresponding network device 14.

Figure 2:
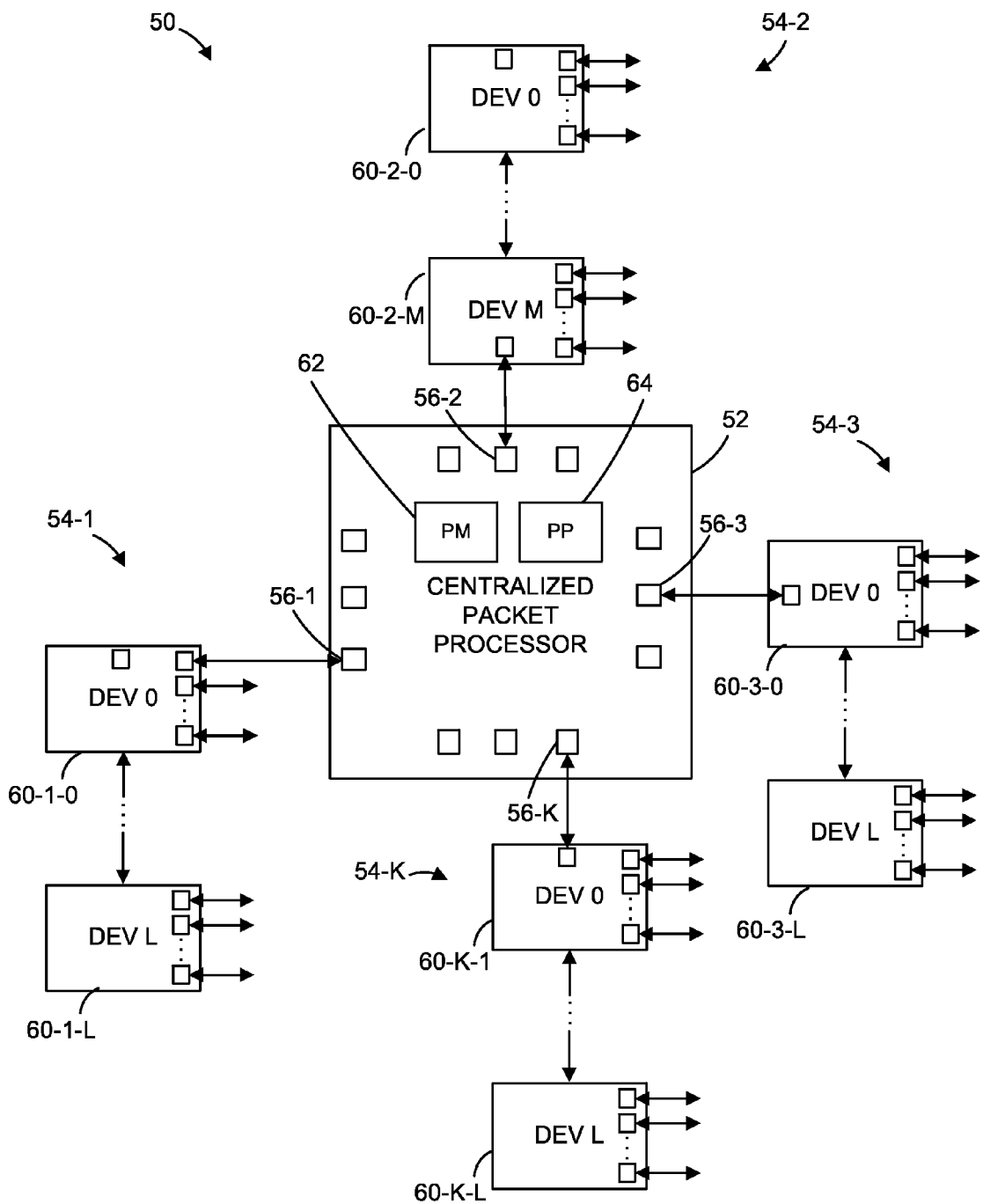
FIG. 2 is a block diagram of a communication system in which a centralized packet processor is communicatively coupled to several multi-device systems to provide packet processing functionality for at least some packets received or originated at the multi-device systems, according to an embodiment.

Referring to FIG. 2, according to an embodiment, a communication system 50 is a single logical system that includes a centralized packet processor 52 communicatively coupled to several multi-device systems 54 via respective physical ports 56 of the centralized packet processor 52. The multi-device systems 54 sometimes are referred to herein as "stackable" systems. In at least some of the embodiments, a stackable system 54 includes several network devices 60 (e.g., switches, routers) interconnected so as to define a single logical sub-system that operates in the corresponding network, for example. The network in which the stackable systems 54 operate sometimes operate using different communication protocols. In an embodiment, some or all of the stackable systems 54 are legacy port-VLAN based systems.

The centralized packet processor 52 in some of these embodiments includes a port manager 62 that assigns eport identifiers to physical ports of the network devices 60 and effectively utilizes these physical ports as interfaces local to the centralized packet processor 12. Similar to the port manager 32 of the centralized packet processor 12 discussed above, the port manager 62 associates physical ports with eports so that physical ports having same local identifiers within respective network devices 60 and/or stackable systems 54 are uniquely identified at the centralized packet processor 52. In the example seen in FIG. 2, the topology of the communication system 50 (in which a centralized packet processor is connected to several stackable systems) is referred to herein as "star topology." Similar to FIG. 1, the communication system 50 includes a network device coupled to several component systems; however, in the example of FIG. 2, some or all component systems are multi-device systems.

The centralized packet processor 52 includes K physical ports 56 and, in an embodiment, the maximum number of stackable systems 54 to which the centralized packet processor 52 can be directly connected is equal to the number of physical ports 56. However, the centralized packet processor 52 can operate with more than stackable systems 54 than the number of physical ports 56 if one or more stackable systems 54 is coupled to another stackable system in a daisy-chain configuration, for example. The system 50 generally is easily expandable to include a larger number of network devices 60 and, accordingly, a larger number of front panel ports. Similar to the centralized packet processor 12, the centralized packet processor 52 does not implement queuing, scheduling, shaping, etc. for the physical ports of the network devices 60, according to an embodiment. Thus, in this embodiment, addition of new stackable systems 54 and new network devices 60 generally do not require a large amount of additional memory on the processor 52.

Membership in each stackable system 54 typically is limited to L network devices, in an embodiment. For example, network devices in the stackable system 54-1 address each other using a five-bit identifier, and accordingly the maximum number of network devices in the stackable system 54-1 is 32 (i.e., L=32). As another example, when stackable systems 54 are connected to a centralized packet processor 52, only L−1 of L available device numbers are allocated to the stackable systems 54, and one device number is allocated to the centralized packet processor 52 itself. In an embodiment, network devices 60-1 in the stackable system 54-1 form a chain in which a source network device 60-1-0 forwards a packet to a target network device by transmitting the packet to an immediate neighbor 60-1-0 of the source network device 60-1-0, and so on, until the packet reaches the target network device. In other embodiments, however, the stackable system 54-1 utilizes another topology (e.g., a star topology, a mesh topology, etc.). Of course, the stackable system 54-1 need not include 32 network devices, and can instead include fewer than 32 network devices or even a single network device.

In some implementations, at least one of the stackable systems 54 is a legacy system that implements limited packet processing functionality and relies on an external device, e.g., a CPU executing software instructions, to handle packets of the type not supported by the network devices in the stackable system 54. To this end, the stackable system 54 is configured to forward packets of unsupported types to the external device (not shown) via a certain port and receive processed packets from the external device via the same or another port. In an embodiment, the centralized packet processor 52 is configured to provide processing for packets in accordance with protocols that are not supported at stackable systems 54, thereby eliminating the need to process such packets at a CPU or another external device. Further, the centralized packet processor is configured to operate with one or more legacy stackable systems 54 in a manner that does not require reconfiguration or other modifications to the legacy stackable system 54, according to an embodiment. For example, with respect to a certain legacy system, the centralized packet processor 52 operates as the external device to which the legacy system is already configured to forward selected packets. Thus, the centralized packet processor 52 in some configurations seamlessly interconnects several legacy stackable systems 54 to define a single logical system.

Further, in some implementations of the system 50, the centralized packet processor 52 interconnects two or more stackable systems 54 that implement different protocols and/or switching and routing techniques. As an example, the stackable system 54-1 supports multi-protocol label switching (MPLS) and not TRILL, while the stackable system 54-2 supports TRILL and not MPLS in one example configuration of the system 50. The centralized packet processor 52 is coupled to each of the stackable systems 54-1 and 54-2 via respective physical ports 56 to provide a physical path for packets travelling between these systems as well as translation between MPLS and TRILL packets. To this end, a packet processor unit 64 operating within the centralized packet processor 52 supports both MPLS and TRILL protocols and associated routing/forwarding/etc. techniques. In an embodiment, the types of traffic each legacy system forwards to the centralized packet processor 52 are user-selectable.

In an embodiment, the packet processor unit 64 is pre-configured to support multiple packet processing techniques, e.g., the full set of features of a protocol for which the network devices 54 support only some of the features. In this manner, the centralized packet processor 52 can be efficiently deployed in a variety of applications without additional configuration.

Using the star topology discussed above, a large number of front panel ports can be provided in a single logical system such as the system 50. For example, when the centralized packet processor 52 is coupled to K stackable systems 54, each of which includes L network devices (in an embodiment) with N physical ports (in an embodiment) in each device, the system 50 can include up to K*L*N front panel ports (however, some of these ports possibly are used for inter-device or inter-stackable-system connections). In an embodiment, a device identifier is reserved to identify the centralized packet processor 52, and the maximum amount of front panel ports is K*(L−1)*N.

With continued reference to FIG. 2, the port manager 62 associates the physical ports of the network devices 60 with eport identifiers that are unique within the system 50, in an embodiment. Similar to the centralized packet processor 12, the centralized packet processor 52 utilizes the physical ports of the network devices 60 as local interfaces. In an embodiment, physical ports on separate network devices 60, typically but not necessarily operating within a same stackable system 54, are grouped into a single trunk. The ability of the centralized packet processor 52 to aggregate physical ports of separate network devices 60 is user-configurable, in an embodiment. According to an embodiment, the port manager 62 efficiently manages such groupings using eport identifiers, e.g., by maintaining lists of eport identifiers associated with a particular trunk.

According to some embodiments, the physical ports 56 are configured to receive communication links such as ethernet links directly, i.e., without using intermediate line cards. For example, the centralized packet processor 52 can be provided in a "pizza box" case. On the other hand, referring back to FIG. 1, the centralized packet processor 12 in some embodiments is provided in a housing configured to accept slide-in, i.e., "blade," network devices. However, in some embodiments, the centralized packet processors 12 and 54 share a common integrated circuit, a set of software instructions, etc. at least as one of the components.

Figure 3:
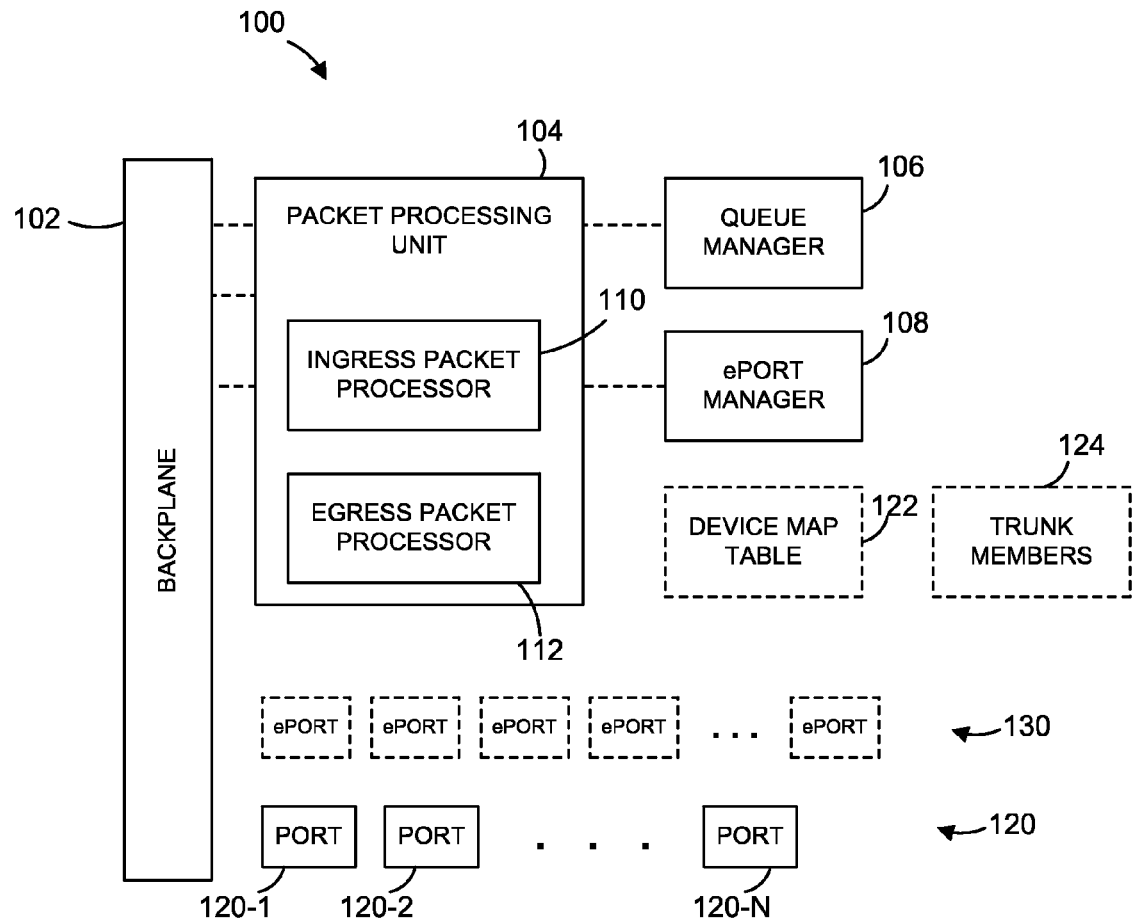
FIG. 3 is a block diagram of an example centralized packet processor that operates in the system of FIG. 1 or FIG. 2, according to an embodiment.

Next, FIG. 3 is a block diagram of an example centralized packet processor 100 that can operate as the centralized packet processor 12 and/or the centralized packet processor 52, depending on the embodiment, to interconnect network devices and/or stackable systems in the corresponding logical system. The centralized packet processor 100 includes a backplane 102 on which a packet processing unit 104, a queue manager 106, and an eport manager 108 are implemented. The backplane 102 further supports a set of physical ports 120 through which the centralized packet processor 100 communicates with devices external to the centralized packet processor 100. In an embodiment, the centralized packet processor 100 operates in a chassis, and at least some of the physical ports 120 are used to communicate with line cards disposed on the chassis. In another embodiment, however, the centralized packet processor 100 operates in a physical device disposed separately from the network devices with which the centralized packet processor 100 communicates via the physical ports 120. Thus, in various embodiments, the centralized packet processor 100 can include, or reside in, a housing in which expansion devices (e.g., line cards) can be mounted, a housing that encloses the centralized packet processor as a stand-alone device, etc. Accordingly, the physical ports 120 in different embodiments conform to different formats, configurations, speed (e.g., 10 Gbit or 40 Gbit). Depending on the embodiment, a physical port 120 is directly coupled to a single network device, a stackable system that includes two or more network devices, a network, another network entity, etc. Further, in some embodiments, at least one of the physical ports 120 is directly coupled to a single network device, while at least another one of the physical ports 120 is directly coupled to a stackable system that includes multiple network devices. Because the centralized packet processor 100 operates at a center of a multi-device logical system such as the logical system 20 or the logical system 50 discussed above, the physical ports 120 sometimes are referred to herein as "centralized ports."

The centralized packet processor 100 includes a device map table 122 disposed in a computer-readable memory such as RAM, ROM, etc., in some embodiments. The device map table 122 stores unique virtual device identifiers for each network device operating in the logical system, coupled either directly to one of the physical ports 120 or indirectly via one or more network devices operating in the corresponding stackable system. Further, in an embodiment, the centralized packet processor 100 includes a trunk members table 124 disposed in the computer-readable memory. The trunk members table 124 indicates, which of the network devices and the physical ports on these network devices belong to one or more trunks the centralized packet processor 100 is configured to support.

In an embodiment, the packet processing unit 104 includes an ingress packet processor 110 and an egress packet processor 112. In at least some of the embodiments, the packet processing unit 104 includes other components, such as one or more of those discussed below with reference to FIG. 5. The eport manager 108 processes and forwards packets using a set of eports 130. The eport manager 108 is implemented as a component separate from the packet processing unit 104 or as a module operating within the packet processing unit 104, depending on the embodiment. In a typical implementation of the centralized packet processor 100, the eports are logical resources mapped to actual physical ports on network devices coupled to the centralized packet processor 100. During operation, the ingress packet processor 110 processes packets ingressing via physical ports 120, including making forwarding decisions (i.e., for egress via physical ports 120), determining whether a packet should be trapped or mirrored to another processor (not shown) for further analysis, determining whether a packet should be discarded, etc. In an embodiment, the ingress packet processor 110 processes the received packets using eport assignment included in the tags associated with (e.g., transmitted with) the ingressing packets. The packet processor 110 utilizes the device map table 122 to populate one or several fields of a switching tag of a packet to be transmitted to a network device via one of the physical ports 120. Processing and restoration of switching tags, such as distributed switching architecture (DSA) tags, is discussed in more detail below.

The queue manager 106 manages data queues associated with each of the ports 120, in an embodiment. Further, in some embodiments, neither the queue manager 106, nor any other component of the centralized packet processor 100, implements queues for those of the front panel ports that are in network devices external to the centralized packet processor 100. Instead, network devices coupled to the centralized packet processor 100 implement queues for the physical ports of these network devices. In some of these embodiments, the network devices also implement their own scheduling, shaping, etc.

In one embodiment, the centralized packet processor 100 is implemented on one or more integrated circuits (ICs). In another embodiment, the centralized packet processor 100 includes a processor that executes software and/or firmware instructions.

Generally speaking, the centralized packet processor 100 does not require special-purpose configuration to support one or more stackable systems, in an embodiment. For example, the packet processing unit 104 is configured to support multiple protocols, standards, etc. for use with a wide variety of network devices or stack systems, including legacy network devices or legacy stack systems already deployed and operational. By contrast, to support a typical legacy stackable system, a processor is specifically configured for that legacy stackable system, i.e., the processor implements functionality specifically required in the communication system in which the legacy stackable system operates, and does not implement other functionality that can be used in another communication system. For example, a legacy stackable system sometimes includes several network devices and a dedicated CPU configured as a special-purpose packet processor, to which the network devices forward unsupported packets.

Further, the centralized packet processor 100 provides crossbar functionality to several logical systems (e.g., the stackable systems 54) so as to efficiently define a single logical system, in an embodiment. Thus, the centralized packet processor 100 permits legacy stackable systems to be interconnected where these legacy stackable systems cannot otherwise be easily connected to each other, especially when such systems are configured to operate using different protocols.

Still further, the centralized packet processor 100 does not require that stackable systems coupled thereto be re-configured or otherwise modified to operate. Thus, the centralized packet processor 100 can be quickly and efficiently deployed to interconnect several existing and operational stackable systems even though the existing systems may, or may not, be compliant with all of the various communication protocols that are supported by the centralized packet processor 100.

Figure 4A:
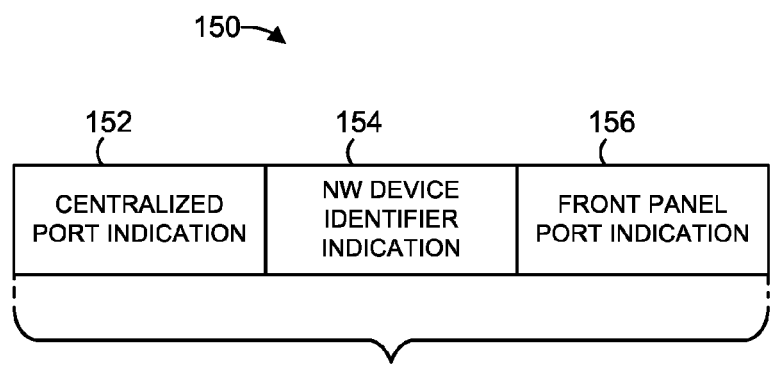
FIG. 4A is block diagram of a port identifier used by the centralized packet processor of FIG. 3 to process packets, in an embodiment.

To further illustrate the operation of the centralized packet processor 100, FIG. 4A depicts an example eport identifier 150 that the centralized packet processor 100 utilizes to process and forward packets, according to some embodiments of the present disclosure. During operation, an eport manager (such as the eport manager 108, for example) in some embodiments generates an eport identifier for a packet received at the centralized packet processor 100 using information included in the packet as well as a description of the interface (e.g., port 120) at which the packet enters the logical system in which the centralized packet processor 100 operates. In an embodiment, the centralized packet processor 100 uses the generated eport identifier when processing the packet. For example, the centralized packet processor 100 applies a forwarding rule to the packet in view of the eport identifier, determines one or more front panel ports to which the packet is to be forwarded (in its original or modified form, depending on the scenario), and uses appropriate eport identifiers to identify the one or more front panel ports. Further, in some implementations, the centralized packet processor 100 uses VIDX, extended VIDX (eVIDX), eVLANs to identify multiple ports or eports to which the packet is to be forwarded.

In an embodiment, the eport identifier 150 includes a centralized port indication field 152 generated using the identifier (e.g., a number) of the physical port 120 at which the centralized packet processor 100 receives a packet from a network device. In one configuration, the field 152 corresponds to a certain number of least significant bits (LSBs) of the identifier of the physical port 120. The number of LSBs is user-configurable, in at least some of the embodiments. In the example of FIG. 4A, the eport identifier 150 further includes a network device indication field 152 that is generated using the identifier of the network device at which the packet is received. Similar to the field 152, the field 154 can include any suitable number of bits (such as LSBs) of the identifier of the network device, in at least some of the embodiments. Still further, the eport identifier 150 includes a front panel port indication field 154 generated using the identifier of the physical port of a network device (such as the network device 14 or 60, for example) at which the packet is received. In an embodiment, similar to the fields 152 and 154, the field 156 includes any suitable, user-configurable number of bits (such as LSBs) of the identifier of the physical port.

In another embodiment, the physical port of a network device (such as the network device 14 or 60, for example) at which the packet is received is configured as a member of a certain trunk group. In this case, the network device assigns the source trunk identifier to the received packet, and the eport identifier 150 includes a configurable number of LSB bits of the source trunk identifier and the identifier (e.g., a number) of the physical port 120 at which the centralized packet processor 100 receives a packet from a network device, according to an embodiment.

Referring back to FIG. 1, according to an example scenario, a packet arrives at the port 22-1 of the network device 14-1, and is forwarded to the port 24-1 of the centralized packet processor 12. Upon arrival of the packet at the port 24-1, the centralized packet processor 12 generates an eport identifier using the respective identifiers of the port 22-1, the network device 14-1, and the port 24-1. It is noted that the local identifier of the port 22-1 is not necessary unique in the system 10, and two or more network devices 14 may include physical ports having the same identifier.

In an embodiment, a packet arriving at a front panel port includes in the header a switching tag, or an information element that includes one or more parameters such as, for example, the source port, the source trunk, the source device at which the packet is received, etc. In response to receiving a packet including a switching tag, a port manager (e.g., the port manager 108 of FIG. 3) generates an eport identifier based on the physical port 208 at which the packet is received, an identifier of a source device from which the packet is received (e.g., a network device 14 or 60) specified in the switching tag, and an identifier of a physical port of the source device at which the packet is received, also specified in the switching tag. In another embodiment, the source trunk is alternatively or additionally used to generate an eport identifier. The switching tag is stored in a memory while the packet is being processed by the centralized packet processor, according to some embodiments. In one such embodiment, for example, the network manager uses only the generated eport identifier to process the packet; however, upon processing the packet, the centralized packet processor retrieves the stored switching tag from the memory and includes the switching tag in the header of the packet upon egress. In some situations, the network process modifies the switching tag as necessary (e.g., modifies the source device identifier in the switching tag to indicate that the packet has been processed by the centralized packet processor).

In some of these embodiments, the switching tag is formatted as a distributed switching architecture (DSA) tag or an extended DSA tag. In general, a DSA tag includes information used by a centralized packet processor or a network device to forward a packet through a system comprising multiple devices. In an embodiment, the DSA tag is included in a header of the packet by a source device (e.g., a switching device) in a communication system, and is removed from the packet by a target device (e.g., another switching device) in the switching system before or as the packet egresses the communication system. In one embodiment, the DSA tag includes indications of one or more of i) a source device (i.e., a source switch device in the switching system), ii) a target device (i.e., a target switch device in the switching system), iii) a physical source port, iv) a physical target port, etc. In one embodiment, the DSA tag additionally or alternatively includes indications of one or more of i) a source eport, ii) a target eport, iii) an eVLAN, iv) an index indicating a list of eports and/or v) an index indicating a list of physical ports to which the packet should be replicated (referred to herein as eVIDX and VIDX, respectively), etc. Further, when a packet is to be broadcast, multicast, flooded, etc., for example, a replication unit of a network device or centralized packet processor utilizes the VIDX to determine how many copies of a packet to create, and to determine the physical ports to which the copies should be passed, in some scenarios. Similarly, when a packet is to be broadcast, multicast, flooded, etc., for example, a replication unit of the network device 100 utilizes the eVIDX to determine how many copies of a packet to create, and to determine the eports to which the copies should be passed, in some scenarios.

In general, the fields 152-156 can be arranged in any order, depending on the implementation or the desired configuration of the centralized packet processor 100. Further, the eport identifier 150 in some embodiments includes additional fields. For example, in one such embodiment, the eport identifier 150 also includes a field (not shown) generated using an identifier of a trunk specified in the DSA tag.

Figure 4B:
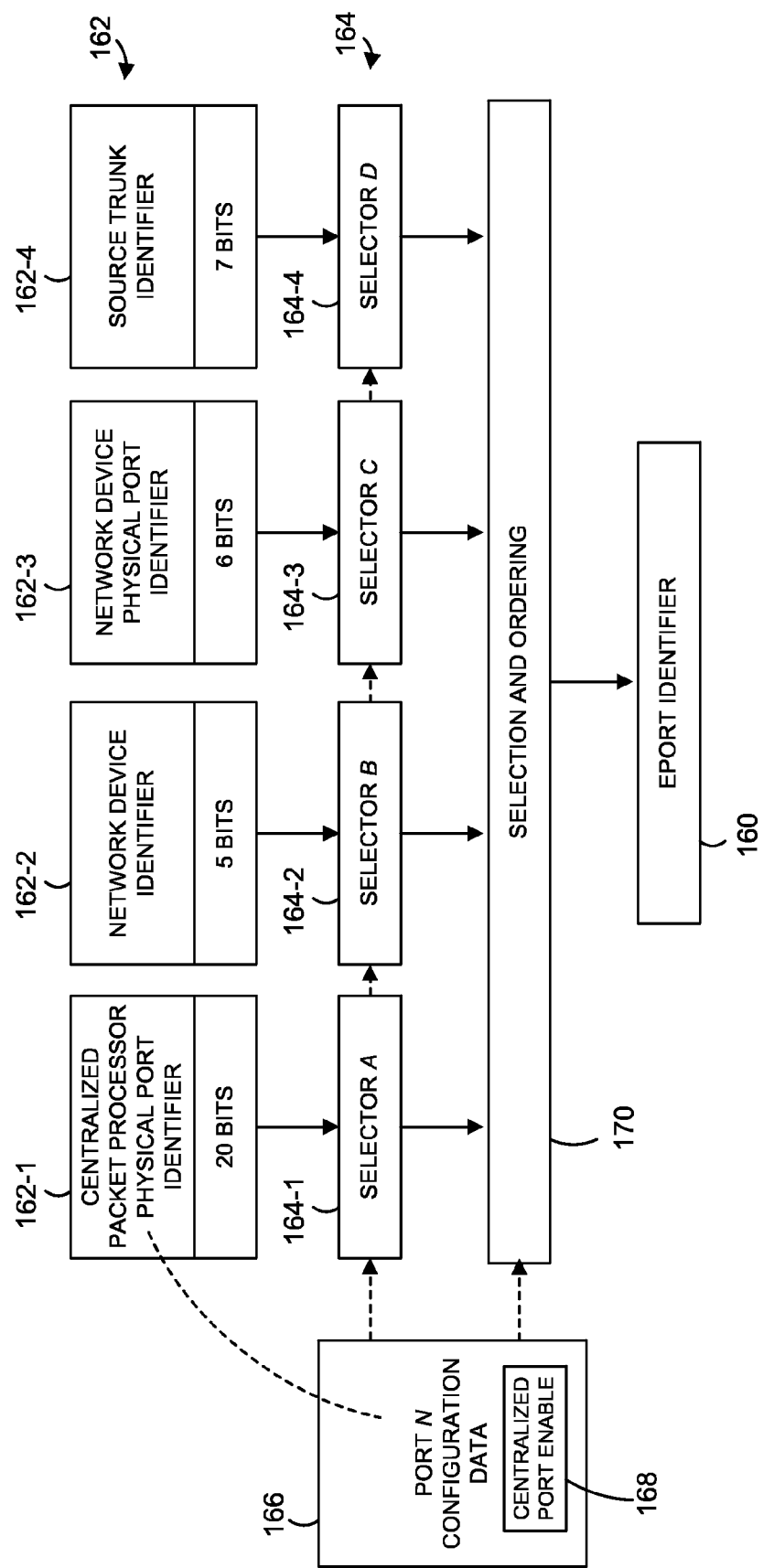
FIG. 4B is a functional diagram that illustrates an example technique for generating a port identifier implemented by the centralized packet processor of FIG. 3, in an embodiment.

Next, FIG. 4B illustrates another example technique for generating an eport identifier 160 using some or all information components 162. Similar to the eport identifier 150 discussed with reference to FIG. 4A, the eport identifier 160 is used by the centralized packet processor 100 or a similar network device to process a packet received from network devices coupled to the network device, according to some embodiments. In an embodiment, selectors 164-1, 164-2, 164-3, and 164-4 are applied to the information components 162-1, 162-2, 162-3, and 162-4, respectively. The selectors 164 are implemented as bit masks, according to some embodiments. In other embodiments, the selectors 164 are implemented as functions that extract and shift bits in specified positions of the corresponding information component. For example, in a configuration consistent with one such embodiment, the selectors 164-1, 164-2, 164-3, and 164-4 specify that five LSBs are extracted from the component 162-1, and three LSBs are extracted from each of the components 164-2, 164-3, and 164-4. In still other embodiments, the selectors 164 are implemented as hashing functions.

Further, in an embodiment, some of the selectors or groups of selectors 164 implement mutually exclusive selection. For example, if the selector 164-4 selects information component 162-4 (source trunk identifier), none of the information components 162-2 (network device identifier) and 162-3 (network device physical port identifier) can be selected. Conversely, if the information components 162-2 and 162-3 are selected, the information component 162-4 cannot be selected.

In an embodiment, the component 162-1 is a 20-bit default eport identifier. In some configurations, a unique value is assigned to the identifier 162-1 for each physical port of the network connected to a component system. Thus, in these configurations, the default eport identifier 162-1 can be regarded as the physical port identifier. The component 162-2 is a five-bit identifier of the ingress device (e.g., a network device) from which the packet is forwarded to the centralized packet processor. In some embodiments, particularly in those in which the centralized packet processor operates in a logical system that conforms to a star topology, the identifier 162-2 uniquely identifies the network device within a stackable system, but not necessarily within the entire logical system. The component 162-3 is a six-bit identifier of the physical port of the ingress device at which the packet is received. In at least some of the embodiments, the identifier 162-3 uniquely identifies the physical port within the network device that receives the packet, but not necessarily within the entire logical system. In an embodiment, the identifier 162-3 uniquely identifies the physical port within the stackable system that includes the ingress device. Further, the component 164-4 is a seven-bit identifier of the trunk via which the packet is received at the ingress device. Depending on the embodiment, the trunk spans one or more physical ports on a single network device or multiple network devices.

Configuration data 166 indicates how packets received at the physical ports of the centralized packet processor are to be processed. In some embodiments, the configuration data 166 includes per-port configuration data. For example, in one implementation, the configuration data 166 includes a Centralized Port Enable flag 168 for each physical port to indicate whether the port operates as a centralized port, i.e., whether the centralized packet processor is to perform ingress packet processing and interface assignment for packets forwarded to the physical port from the corresponding ingress device. In an embodiment, when set to "false," the flag 168 indicates that the ingress device performs ingress packet processing and interface assignment. Otherwise, when the flag 168 is set to "true," the centralized packet processor performs ingress packet processing and interface assignment for the received packets. Also, in some configurations, the flag 168 is set to "true" when the port is connected to an external local or wide area network.

As seen in FIG. 4B, the configuration data 166 further includes a selection and ordering indication 170 to indicate how portions of some or all of the information components 164 are ordered, and which of the information components 164 are used to generate the eport identifier 160. Also, in some embodiments, the configuration data 166 includes the eport identifier 162-1.

Figure 5:
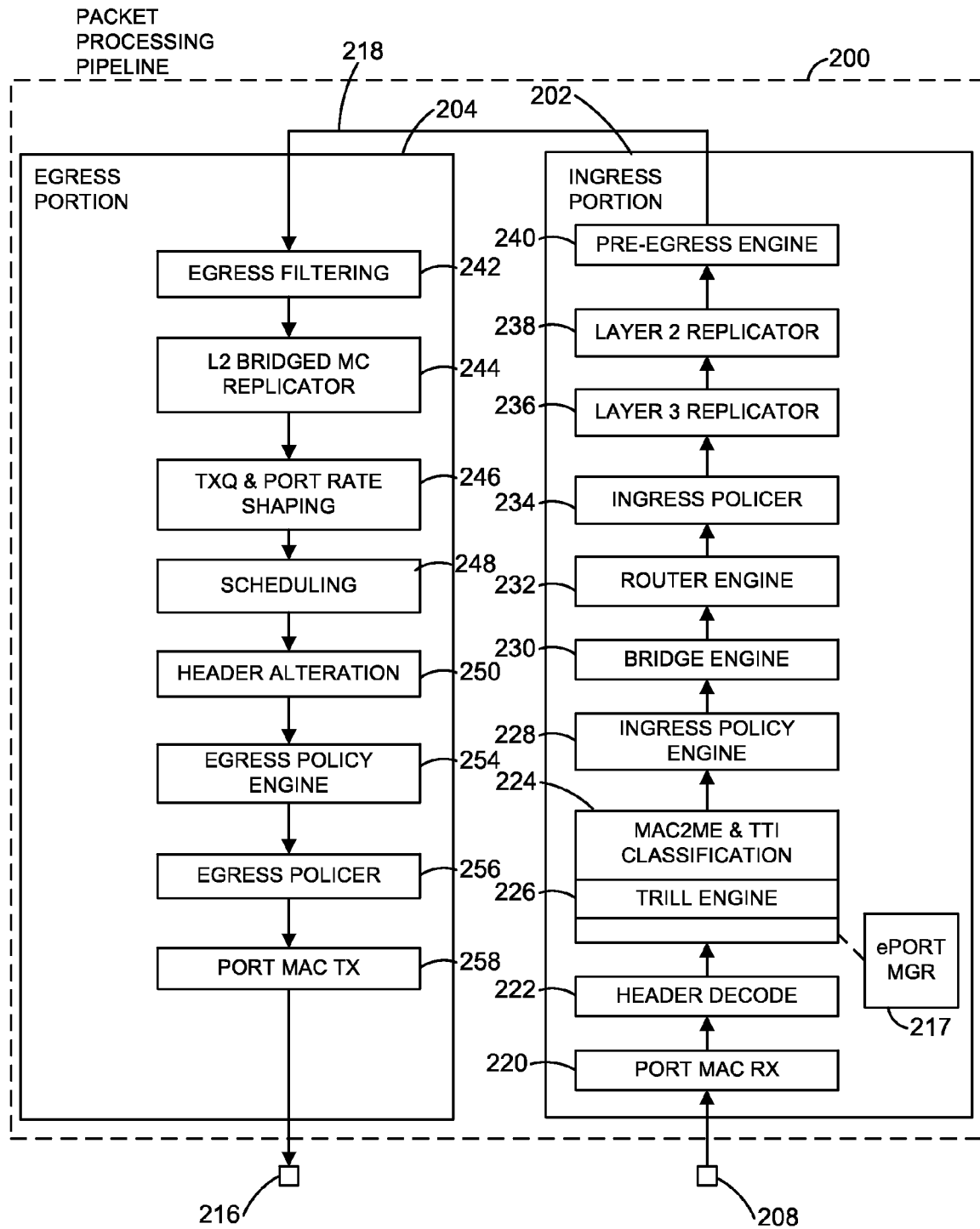
FIG. 5 is a block diagram of an example packet processor operating in a centralized packet processor, according to an embodiment.

FIG. 5 is a block diagram of an example packet processing pipeline 200 that operates in a centralized packet processor that interconnects several line cards to define a single logical system with a high number of front panel ports, such as the centralized packet processor 12, or in a centralized packet processor that interconnects several stackable systems in a start topology configuration, such as the centralized packet processor 52, in accordance with some embodiments of the present disclosure. In one such embodiment, the packet processing pipeline 200 operates in the packet processor 104 of the centralized packet processor 100. For example, the ingress packet processor 110 is implemented as an ingress portion 202, and the egress packet processor 112 is implemented as an egress portion 204. In one embodiment, the pipeline 200 is coupled to network devices in the corresponding logical system via some of the physical ports 208, 216 that correspond to an ingress portion and an egress portion, respectively.

The packet processing pipeline 200 is configured to utilize eports and eVLANs when processing and forwarding packets and, in an embodiment, to handle a large number of eports mapped to actual physical ports that make up the set of front panel ports of a single logical system having multiple network devices. In an embodiment, the packet processing pipeline 200 generates eport identifiers using the technique discussed with reference to FIG. 4A.

At least some of the ingress physical ports 208 and the egress physical ports 216 are coupled to other network devices. For example, the ingress physical ports 208 and the egress physical ports 216 are coupled to network devices such as the devices 14 or devices operating in the network 16 that operate as single devices or in respective stackable systems, in various embodiments. For purposes of clarity, only one ingress physical port and one egress physical port are illustrated. In some embodiments and scenarios, traffic ingressing on a single physical port is assigned to different eports. For instance, traffic corresponding to different tunnel interfaces but ingressing on the same physical port is assigned to different eports. For example, traffic corresponding to different quality of service (QoS) requirements but ingressing on the same physical port is assigned to different eports.

The packet processing pipeline 202 generally transfers packets of data from the ingress physical ports 208 to one or more egress physical ports 216, in an embodiment. In some embodiments, at least some physical ports are input/output ports, and at least some ingress physical ports 208 and egress physical ports 216 correspond to the same physical ports.

As seen in FIG. 5, the ingress portion 202 and the egress portion 204 each include a plurality of processing units coupled in series. Generally, each unit of a pipeline optionally processes a packet or a packet descriptor corresponding to the packet and then passes the packet or the packet descriptor to the next unit in the pipeline. A packet descriptor includes some information from the packet, such as some or all of the header information of the packet, in an embodiment. In some embodiments, the packet descriptor includes other information as well such as an indicator of where the packet is stored in a memory associated with the pipeline 200. For ease of explanation, the term "packet" hereinafter is used to refer to a packet itself or to a packet descriptor associated with the packet. Each unit in the pipeline 200 may or may not process a particular packet. For example, in some instances, a unit simply passes a packet onto the next unit in the pipeline 200. The last unit of the ingress portion 202 passes the packet to the first unit of the egress portion 203 via a fabric interface 218, in an embodiment.

Each or at least some of the units of the ingress portion 202 and the egress portion 204 includes, or otherwise is associated with, a corresponding memory or a suitable part of a shared memory space, in an embodiment. A packet received by a unit is stored in the memory associated with the unit, in an embodiment.

In some embodiments, the packet processing pipeline 200 includes an eport manager 217 at least partially distributed amongst a plurality of processing units, in an embodiment. In another embodiment, the eport manager 217 operates outside the packet processing pipeline 200. During operation, the eport manager 217 assigns eports to ingressing packets. As discussed in more detail below, in some embodiments, the eport manager 217 generates eport identifiers based on the physical port of the centralized packet processor that includes the packet processing pipeline 200 is received and in information included in, or associated with, the ingressing packet. In one such embodiment, the eport manager 217 using the technique discussed with reference to FIG. 4A to generate an eport identifier using a DSA tag and an identifier of the physical port 208.

In some embodiments, the ingress portion 202 assigns eports and/or one or more eVLANs to packets ingressing at a physical ports 208 connected to an external network (e.g., the network 208) rather than a network device operating within the same logical system as the centralized packet processor that implements the packet processing pipeline 200. In some of these embodiments, the ingress portion 202 also assigns attributes to the packet based on the eport and/or the eVLAN. The assigned attributes are utilized by units of the pipeline 200 to determine how the packet is to be processed, for example. For example, determining whether to forward, trap, or mirror a packet is based on an attribute assigned based on an eport and/or an eVLAN.

In the example of FIG. 5, the ingress portion 202 includes a port media access control (MAC) receiver unit 220 coupled to the ingress physical ports 208. The port MAC receiver unit 120 generally implements media access control functions. Further, the ingress portion 202 includes a header decode unit 222 coupled to the port MAC receiver unit 220 to decode the header of each packet received via the ingress physical ports 208. A MAC2ME & TTI classification unit 224 is coupled to the header decode unit 222 to generally perform several functions, including for example, assigning or, in some circumstances, reassigning a source eport to each packet, assigning and/or reassigning an eVLAN to some packets, and performing lookup functions (e.g., looking up packets that are destined to a certain MAC address, looking up termination and interface assignment (TTI), etc). In one embodiment, the MAC2ME & TTI classification unit 224 includes a TRILL engine 226 configured to operate according to the TRILL protocol set forth in the Request for Comments (RFC) 556 from the Internet Engineering Task Force (IETF), dated May 2009. Depending on the embodiment, the MAC2ME & TTI classification unit 224 utilizes one or more tables, databases, and/or other data library maintained in one or more memory components, such as a ternary content-addressable memory (TCAM).

With continued reference to the example ingress portion 202 illustrated in FIG. 5, an ingress policy engine 228, coupled to the MAC2ME & TTI classification unit 224, generally performs flow classification. Further, a bridge engine 230 is coupled to the ingress policy engine 228 and includes, or is coupled to, a forwarding database (not shown) that includes MAC destination addresses and indications of the corresponding egress eports to which packets having the MAC destination addresses should be forwarded, for example. In an embodiment, the bridge engine 230 generally uses Layer-2 information to determine on which eport or eports a packet should be forwarded. Still further, a router engine 232 is coupled to the bridge engine 230. The router engine 232 includes, or is coupled to, a routing information database (not shown) that includes information corresponding to where packets should be forwarded.

An ingress policer engine 234 is coupled to the router engine 232. The ingress policer engine 234 generally performs rate limiting and makes flow traffic measurements and stores flow measurement information for different flows, according to an embodiment. A Layer-3 replicator unit 236 is coupled to ingress policer engine 234. When a Layer-3 routed packet that is to be transmitted to multiple destinations is received by the Layer-3 replicator unit 236, the Layer-3 replicator unit 236 creates one or more duplicates of the packet for forwarding to the set of one or more eports determined by the router engine 232. A Layer-2 replicator unit 238 is coupled to the Layer-3 replicator unit 236. When a Layer-2 bridged packet that is to be transmitted to multiple destinations is received by the Layer-2 replicator unit 238, the Layer-2 replicator unit 238 creates one or more duplicates of the packet for forwarding to the set of one or more eports determined by the bridge engine 230. A pre-egress engine 240 is coupled to the Layer-2 replicator unit to consolidates decisions of previous units in the ingress portion 202 into a single decision, and updates the descriptor of the packet accordingly.

The egress portion 204 is coupled to the pre-egress engine 240, in an embodiment. In one embodiment and in some scenarios, the pre-egress engine 240 determines one or more physical targets corresponding to the one or more target eports to which a packet is to be forwarded when the target device for the packet is the network device 100. A physical target could be a physical port/device pair, a trunk, a tunnel start, a list of physical ports, etc. In some embodiments, packets received from network cards that implement own scheduling, shaping, etc. bypass certain stages implemented by the egress portion 204. In an example scenario, a packet is received from a network device that implements scheduling and shaping, assigned an eport identifier, processed using the eport identifier and, during egress processing, is directed to bypass the components 246-254. Further, depending on the embodiment, packets in such situations can be configured to bypass fewer or more of the components 242-258 of the egress portion 204.

In an embodiment, an egress filtering unit 242 is coupled to the pre-egress engine 140 to perform egress filtering. In some example scenarios, a packet that is to be flooded, or a multicast or broadcast packet is not to be egressed via the same eport on which it ingressed. Thus, the egress filtering unit 142 filters the ingress eport from the plurality of egress eports via which the packet is to be transmitted, for example.

An egress Layer-2 multicast replicator unit (L2 Bridged MC Replicator) 244 is coupled to the egress filtering unit 242 to replicate packets, provide unicast traffic to one or more transmit queues, etc. The Layer-2 multicast replicator unit 244 provides the packet to a transmit queuing and port rate shaping unit (transmit queuing unit) 246. The transmit queuing unit 246 generally performs rate shaping and queues packets in a plurality of queues corresponding to different classes of flows and/or different physical ports, for example. A scheduling unit 248 is coupled to the transmit queuing unit 246. A header alteration unit 250 is coupled to the scheduling unit 248 to maintain information that allows a packet header to be appropriately manipulated to facilitate multicast operations, for example. The header alteration unit 250 also enables control of tagging for customer networks or other subnetwork implementations, in some embodiments.

An egress policy engine 254 generally performs flow classification, e.g., associates a packet that belongs to a recognized flow with the flow by attaching an appropriate flow identifier (ID). An egress policer engine 256 performs rate limiting and makes flow traffic measurements, in an embodiment. A port MAC transmit unit 258 generally implements media access control functions and forwards packets to appropriate egress physical ports 216.

Figure 6:
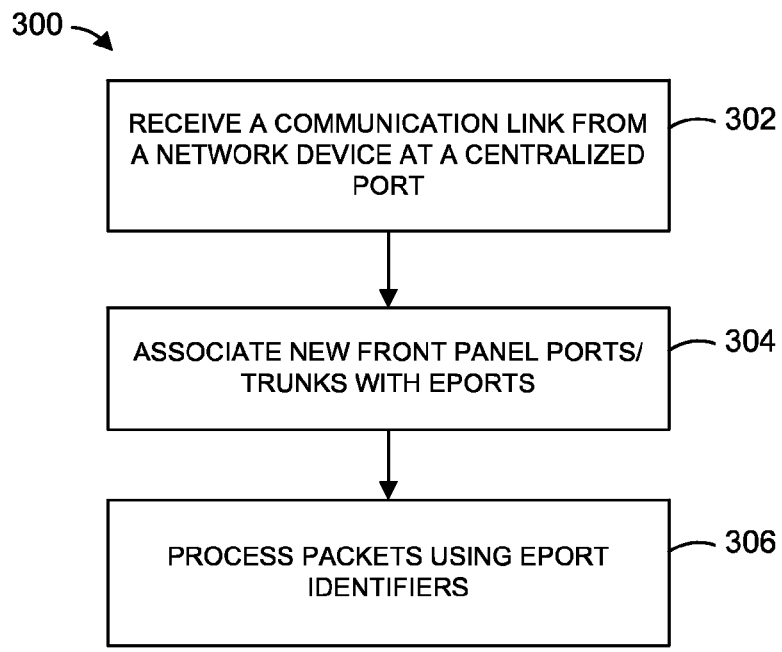
FIG. 6 is a flow diagram of an example method for forming a logical system that includes the centralized packet processor of FIG. 3 and network devices coupled to the centralized packet processor, according to an embodiment.

Next, FIG. 6 illustrates a flow diagram of a method 300 for forming a logical system that includes a centralized packet processor and several network devices coupled to the centralized packet processor, according to an embodiment. The method 300 can be implemented in the centralized packet processor 100 or a device, for example. At block 302, a communication link that connects the centralized packet processor to a network device is received at a centralized port, i.e., a physical port of the centralized packet processor. Depending on the configuration, the network device is a single device such as the device 14 of FIG. 1, or a device operating in a stackable system such as the device 60 of FIG. 2, for example. Next, at block 304, the new front panel ports provided by the one or more network devices (to which the centralized packet processor is now coupled), or trunks to which the ports are assigned, are associated with unique eport identifiers. In some embodiments, no mapping is maintained, and eport identifiers are generated for packets as these packets arrive at the centralized packet processor. To this end, in an embodiment, a deterministic function is executed at block 304 to generate an eport identifier using several attributes of the packet (e.g., the centralized port at which the packet is received, a front panel port at which the packet is received, the network device at which the packet is received, etc.). Thus, in at least some of the embodiments, the centralized packet processor that implements the method 300 need not generate or update a data structure that maps front panel ports to eports of the centralized packet processor.

Using the generated eport identifiers, packets are processed at block 306. In an example scenario, switching information (e.g., a DSA tag) is generated for a packet, and the packet is forwarded back to the network device from which the packet is received. As a more specific example, a network device that does not support certain functionality (e.g., IP) forwards an IP packet to the centralized packet processor and, after the IP packet is processed, the network device receives the packet with such an information that allows the network device to further switch the IP packet (e.g., direct the IP packet to a certain front panel port). In another example scenario, a packet received or originated at a network device in a stackable system is forwarded to a network device that operates at the center of a logical system that conforms to star topology (see FIG. 2), processed at the network device, and forwarded to a network device in another stackable system. Thus, in this scenario, the network device interconnects the two stackable systems. In at least some of the embodiments, neither of the two stackable systems receives configuration specific to the start topology, and thus the network device interconnects the two stackable systems seamlessly and efficiently.

Figure 7:
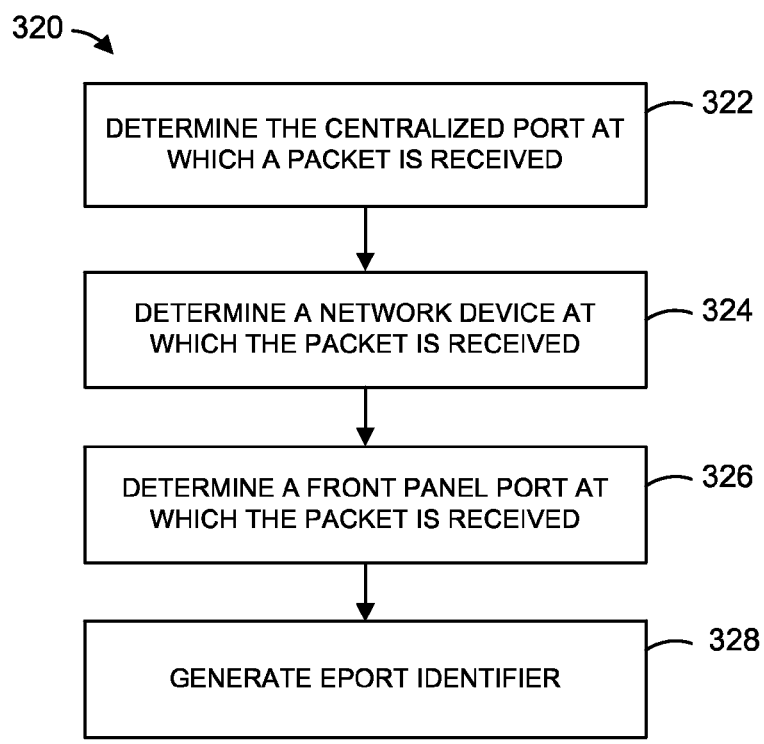
FIG. 7 is a flow diagram of an example method for assigning eport identifiers to certain packets arriving at the centralized packet processor of FIG. 3, according to an embodiment.

FIG. 7 is a flow diagram of a method 320 for assigning identifiers to packets arriving or originating within a centralized packet processor, according to an embodiment. In some embodiments, the method 320 can be partially or fully implemented in the eport manager 108 or the eport manager 217, for example. In an embodiment, the method 320 is executed at block 304 discussed with reference to FIG. 6.

At blocks 322 and 324, several attributes of a packet are processed to determine an eport identifier with which the packet should be associated. In the example of FIG. 7, the centralized port at which the packet is received is determined at block 322. At block 324, the network device at which the packet is received is determined and, at block 326, the front panel port of the network device at which the packet is received is determined. In an embodiment, the information determined at blocks 324 and 326 is retrieved from a DSA tag included in the header of the packet. Alternatively, at blocks 324 and 326, a trunk identifier via which the packet is associated is retrieved from the DSA tag of the packet. Next, at block 328, an eport identifier is generated using the information determined at blocks 322, 324, and 326. For example, in one implementation, a configurable number of LSBs is copied from each of the identifiers determined at blocks 322, 324, and 326, and concatenated together to generate an eport identifier unique within the centralized packet processor in which the method 320 is implemented.

Figure 8:
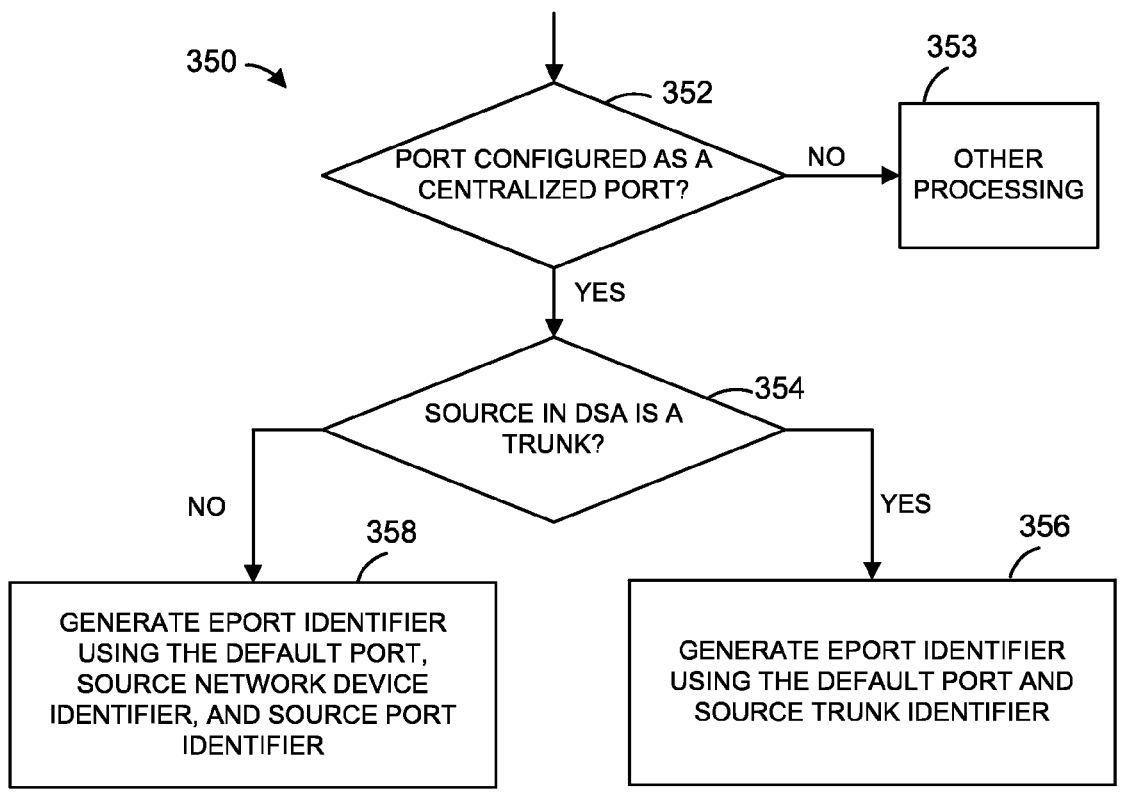
FIG. 8 is a flow diagram of another example method for generating eport identifiers to certain packets arriving at the centralized packet processor of FIG. 3, according to an embodiment.

FIG. 8 is a flow diagram of another example method 350 for assigning an ingress eport to a packet arriving at a physical port of a centralized packet processor. Similar to the method 320 discussed above, the method 350 can be partially or fully implemented in the eport manager 108 or the eport manager 217, for example. At block 352, the configuration of the physical port, to which the packet is forwarded from a network device, is checked to determine whether the physical port is configured to operate as a centralized port that supports eport assignment techniques discussed above. If the port is not configured to operate as a centralized port, the flow proceeds to block 353 for processing the packet using cascade port processing techniques, legacy processing techniques, etc. Otherwise, if is determined that the port is configured to operate as a centralized port, the flow proceeds to block 354, at which the method 350 determines whether the source of the packet is a trunk. To this end, in an embodiment, the DSA tag of the packet is processed. If it is determined that the packet arrived via a trunk (i.e., a port configured to belong to the trunk), an eport identifier is generated at block 356 using the default port identifier of the port and the source trunk identifier specified in the DSA tag of the packet, for example. Otherwise, if it is determined that the packet did not arrive via a trunk, the flow proceeds to block 358, at which an eport identifier is generated using the default port identifier of the port, the identifier of the ingress device, and the physical port of the ingress device, according to an embodiment.

Figure 9:
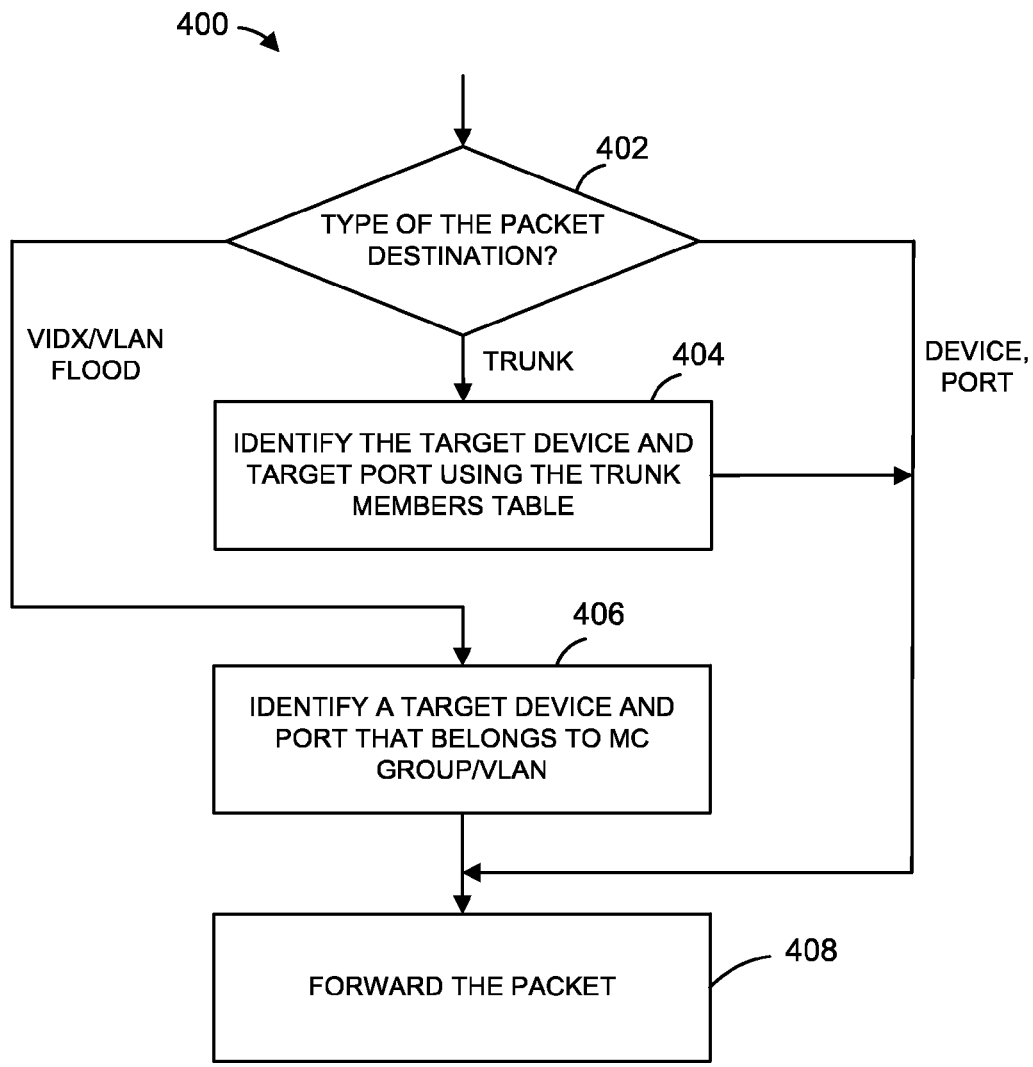
FIG. 9 is a flow diagram of an example method for forwarding a packet from the centralized packet processor of FIG. 3 to one or more network devices, according to an embodiment.

FIG. 9 is a flow diagram of an example method 400 for forwarding a packet to one or more network devices from the centralized packet processor. Referring back to FIG. 5, the method 400 in some embodiments is implemented in the egress portion 204 of the packet processing pipeline 200, for example. In some embodiments, the method 400 is partially or fully implemented in the eport manager 108, for example.

At block 402, the type of the destination of the packet is determined. In an embodiment, the destination of the packet is previously determined by the packet processing unit 104. If the destination of the packet is a trunk, the target device and target port of the packet are determined at block 404 using trunk members table 124, for example (see FIG. 5). The flow then proceeds to block 408. If, however, the destination of the packet is a VIDX, of if the packet is to flood a certain VLAN, one or more target devices and the corresponding target ports are determined at block 406 using suitable tables, linked lists, etc. In at least some embodiments, the method 400 does not include duplication to local ports of the relevant network devices, so that the network devices in the VIDX or VLAN receive a single copy of the packet and locally duplicate the packet as necessary. The flow then proceeds to block 408. If the destination of the packet is specified in the form of a target device and a target port, the packet is forwarded accordingly at block 408.

Figure 10:
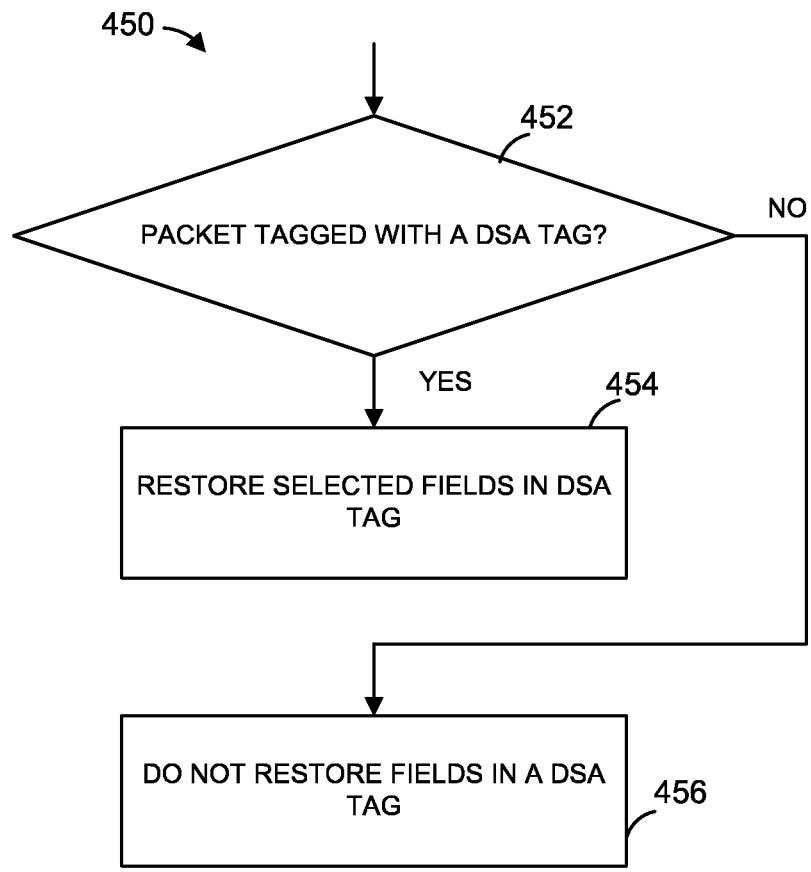
FIG. 10 is a flow diagram of an example method for restoring source interface data when a packet is forwarded from the centralized packet processor of FIG. 3 to one or more network devices, according to an embodiment.

FIG. 10 is a flow diagram of an example method 450 for restoring source interface data for a packet egressing via one of the physical ports of a centralized packet processor toward a network device. In an embodiment, the method 450 is implemented in the egress portion 204 of the packet processing pipeline 200. At block 452, the configuration of the physical port is checked to determine whether the port operates as a centralized port (however, in another embodiment, no specialized logic is applied at an egress of a port of a centralized packet processor, and centralized ports operate similar to non-centralized ports). For example, the configuration data 166 (see FIG. 4B) is checked. Further, depending on the embodiment, one or more additional conditions are checked at block 452. For example, it is checked whether the packet included the DSA tag on ingress. In another embodiment, it is also determined whether the packet is associated with a VIDX. If it is determined that the DSA tag or a portion thereof should be restored, the flow proceeds to block 454, in which certain fields of the incoming DSA tag (with the packet arrived at the centralized packet processor) are retrieved from the memory and included in the DSA tag of the packet. The DSA tag is modified in some situations to indicate that the packet has been processed by the centralized packet processor, for example (e.g., by setting the source device identifier in the DSA tag to the identifier of the centralized packet processor). Otherwise, if it is determined that the DSA tag should not be restored, the flow proceeds to block 456, in which no fields from the incoming DSA tag are included in the DSA tag of the packet. In another embodiment, if it is determined that the DSA tag should not be restored, all fields for a DSA tag are prepared by the centralized packet processor.

According to at least some of the embodiments, all packets traveling between a centralized packet processor and network devices include DSA tags. In these embodiment, the restoration logic implemented in a method similar to the method 450 determines whether a subset of the DSA tag fields are copied from the including DSA tag, or new values determined at the centralized packet processor should be used.

In some scenarios, a network device is identified within the centralized packet processor using a virtual device number. For example, in an embodiment, the network determines the target device to which the packet is to be forwarded and specifies the virtual device number (that is uniquely associated with the device) to the target device field in the DSA tag of the packet. During egress processing, the device map table 122 (see FIG. 3) can be used to determine, based on the virtual device number, a physical port of the network device via which the packet should be transmitted to reach the network device identified by the virtual device number.

It is noted that each of the blocks of the figures are implemented using hardware, a processor executing firmware instructions, a processor executing software instructions, or any combination thereof, depending on the embodiment. For example, in an embodiment, some or all of the components of the packet processing pipeline 200 and the eport manager 217 of FIG. 5 are implemented in a Field Programmable Gate Array (FPGA). In another embodiment, some or all of these components are implemented as an application-specific integrated circuit (ASIC). In an embodiment, the pipeline 200 is implemented on a single integrated circuit (IC). However, in other embodiments, the pipeline 200 is implemented on a plurality of ICs.

In those embodiments where a block is implemented at least partially using a processor that executes software instructions, the software is stored in any computer readable memory such as on a magnetic disk, an optical disk, or other storage medium, in a RAM or ROM or flash memory of a computer, processor, hard disk drive, optical disk drive, tape drive, etc., depending on the embodiment. In some configurations, the software instructions are delivered to a user or a system via any known or desired delivery method including, for example, on a computer readable disk or other transportable computer storage mechanism or via communication media. When implemented in hardware, in some embodiments, the hardware comprises one or more of discrete components, an integrated circuit, an FPGA, an ASIC, etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A centralized packet processor device for use in a communication system, the centralized packet processor device comprising:
a plurality of first physical ports to couple the centralized packet processor device to a plurality of network devices;
a port manager coupled to the plurality of first physical ports and configured to form a virtual port identifier (ID) for a packet received at the centralized packet processor device, the packet including a tag with at least one of i) a) a device ID field for indicating a particular one of the network devices from which the packet is received, and b) a source port ID field for indicating a second physical port of the one network device, or ii) a trunk ID field for indicating a trunk via which the packet was received, wherein the port manager is configured to form the virtual port ID using at least one of i) a) bits from the device ID field, and b) bits from the source port ID field, or ii) bits from the trunk ID field; and
a packet processor unit coupled to the plurality of first physical ports, wherein the packet processor is configured to process the packet using the virtual port ID for the packet.

2. The centralized packet processor of claim 1, wherein the port manager is configured to form the virtual port ID using a) a subset of bits from the device ID field, and b) a subset of bits from the source port ID field.

3. The centralized packet processor of claim 1, wherein the port manager is configured to form the virtual port ID using a subset of bits from the trunk ID field.

4. The centralized packet processor of claim 1, wherein the port manager is configured to form the virtual port ID further using bits of an identifier of a physical port of the centralized packet processor at which the packet is received.

5. The centralized packet processor of claim 1, wherein the tag is included in a header of the packet.

6. The centralized packet processor of claim 1, wherein the packet processor unit implements a packet processing function that is not available at the network device from which the packet is forwarded.

7. The centralized packet processor of claim 6, wherein the packet processor unit supports a protocol not supported by at least one of the plurality of network devices.

8. A centralized packet processor for use in a communication system, the centralized packet processor comprising:
a plurality of first physical ports coupled to a plurality of network devices to receive a packet, wherein each of the plurality of network devices includes a respective set of second physical ports, and wherein the packet includes a tag with at least one of i) a) a device identifier (ID) field for indicating a particular one of the network devices from which the packet is received, and b) a source port ID field for indicating a second physical port at which the packet is received, or ii) a trunk ID field for indicating a trunk via which the packet was received;
a port manager coupled to the plurality of first physical ports and configured to form a virtual port ID using at least one of i) a) bits from the device ID field, and b) bits from the source port ID field, or ii) bits from the trunk ID field; and a packet processor unit coupled to the plurality of first physical ports, wherein the packet processor is configured to (i) process the received packet using the virtual port ID and (ii) apply a packet processing function that is not available at the one network device from which the packet is forwarded.

9. The centralized packet processor of claim 8, wherein the port manager is configured to form the virtual port ID to uniquely identify the second physical port at the network device at which the packet is received.

10. The centralized packet processor of claim 8, wherein the packet processor is configured to support a communication protocol not supported by at least one of the plurality of network devices.

11. The centralized packet processor of claim 8, wherein:
the packet is received from a first one of the plurality of network devices; and
the packet processor unit is configured to forward the packet to a second one of the plurality of network devices.

12. The centralized packet processor of claim 8, wherein the tag is included in a header of the packet.

13. The centralized packet processor of claim 8, wherein the port manager is configured to form the virtual port ID using: a) a subset of bits from the device ID field, and b) a subset of bits from the source port ID field.

14. The centralized packet processor of claim 7, wherein the port manager is configured to form the virtual port ID using a subset of bits from the trunk ID field.

15. The centralized packet processor of claim 7, wherein:
the centralized packet processor is coupled to the one network device via another network device.

16. A method for processing packets in a centralized packet processor, wherein the centralized packet processor includes a plurality of first physical ports and operates in a communication network including the centralized packet processor and a plurality of network devices communicatively coupled to the centralized packet processor via respective ones of the plurality of first physical ports, the method comprising:

receiving, via one of the plurality of first physical ports of the centralized packet processor, a packet forwarded from one of the plurality of network devices, the packet including a tag with at least one of i) a) a device identifier (ID) field for indicating the one network device from which the packet is received, and b) a source port ID field for indicating a second physical port of the one network device, or ii) a trunk ID field for indicating a trunk via which the packet was received;

forming a virtual port ID for the received packet using at least one of i) a) bits from the device ID field, and b) bits from the source port ID field, or ii) bits from the trunk ID field; and processing the packet using the virtual port ID.

17. The method of claim 16, wherein processing the packet includes applying a packet processing function to the packet unavailable at the network device from which the packet is received.

18. The method of claim 16, wherein forming the virtual port ID for the received packet includes using a) a subset of bits from the device ID field, and b) a subset of bits from the source port ID field.

19. The method of claim 16, wherein forming the virtual port ID for the received packet includes further using an identifier of the physical port of the centralized packet processor at which the packet is received.

20. The method of claim 16, wherein forming the virtual port ID for the received packet includes using a subset of bits from the trunk ID field.

* * * * *